US010590857B2

(12) United States Patent
Thomas et al.

(10) Patent No.: US 10,590,857 B2
(45) Date of Patent: Mar. 17, 2020

(54) TURBOCHARGER ASSEMBLY WITH OIL CARRY-OVER PROTECTION

(71) Applicant: Perkins Engines Company Limited, Peterborough (GB)

(72) Inventors: Lorna Thomas, Wells (GB); Prabhu Ramasamy, Peterborough (GB); Kevin C. Earle, Peterborough (GB); Steven A. Gahlings, Great Cambourne (GB)

(73) Assignee: Perkins Engines Company Limited, Peterborough (GB)

( * ) Notice: Subject to any disclaimer, the term of this patent is extended or adjusted under 35 U.S.C. 154(b) by 29 days.

(21) Appl. No.: 15/865,656

(22) Filed: Jan. 9, 2018

(65) Prior Publication Data

US 2018/0202370 A1   Jul. 19, 2018

(30) Foreign Application Priority Data

Jan. 13, 2017 (GB) .................................. 1700601.6

(51) Int. Cl.
*F02C 9/18* (2006.01)
*F01D 25/20* (2006.01)
(Continued)

(52) U.S. Cl.
CPC ................ *F02C 9/18* (2013.01); *F01D 25/16* (2013.01); *F01D 25/20* (2013.01); *F02B 37/004* (2013.01);
(Continued)

(58) Field of Classification Search
CPC ........ F01D 25/16; F01D 25/20; F02B 37/004; F02B 37/007; F02B 37/12; F02B 39/14;
(Continued)

(56) References Cited

U.S. PATENT DOCUMENTS 7,877,997 B2   2/2011   Gruel
9,003,794 B2   4/2015   Robinson et al.
(Continued)

FOREIGN PATENT DOCUMENTS

DE         10331396 A1    2/2005
DE      102012202857 A1    8/2013
(Continued)

OTHER PUBLICATIONS

Machine Translation JP 2016125407 A (Serizawa) (Year: 2016).*

*Primary Examiner* — Brandon D Lee

(57) ABSTRACT

An assembly including a first turbocharger, the first turbocharger including a first turbine and a first compressor, the first turbine arranged in a turbine flowpath to be driven in rotation by an exhaust gas flowing at a variable flow rate through the turbine flowpath. The first compressor arranged in a compressor flowpath to be driven by the first turbine to urge an intake gas to flow through the compressor flowpath. The first turbine and first compressor being supported for rotation in bearings supplied via an oil flowpath at an oil pressure. The assembly further including a seal arranged between the oil flowpath and the compressor flowpath to resist leakage of the oil into the compressor flowpath and a flow control means configured to control a rotational speed of the first turbine and first compressor by controlling the flow of exhaust gas in the turbine flowpath.

20 Claims, 5 Drawing Sheets

(51) Int. Cl.
*F02C 7/06* (2006.01)
*F02C 7/28* (2006.01)
*F02C 9/20* (2006.01)
*F02C 6/12* (2006.01)
*F02B 37/007* (2006.01)
*F02B 37/12* (2006.01)
*F02B 39/14* (2006.01)
*F01D 25/16* (2006.01)
*F02B 37/00* (2006.01)

(52) U.S. Cl.
CPC ............ *F02B 37/007* (2013.01); *F02B 37/12* (2013.01); *F02B 39/14* (2013.01); *F02C 6/12* (2013.01); *F02C 7/06* (2013.01); *F02C 7/28* (2013.01); *F02C 9/20* (2013.01); *F05D 2220/40* (2013.01); *F05D 2240/40* (2013.01); *F05D 2260/60* (2013.01); *F05D 2260/98* (2013.01); *F05D 2270/02* (2013.01); *F05D 2270/024* (2013.01); *F05D 2270/081* (2013.01); *F05D 2270/304* (2013.01); *F05D 2270/3015* (2013.01); *F05D 2270/3062* (2013.01); *Y02T 10/144* (2013.01)

(58) Field of Classification Search
CPC ...... F02C 6/12; F02C 7/06; F02C 7/28; F02C 9/18; F02C 9/20; F05D 2220/40; F05D 2240/40; F05D 2260/60; F05D 2260/98; F05D 2270/02; F05D 2270/024; F05D 2270/081; F05D 2270/3015; F05D 2270/304; F05D 2270/3062; Y02T 10/144
See application file for complete search history.

(56) References Cited

U.S. PATENT DOCUMENTS

| | | |
|---|---|---|
| 9,032,727 B2 | 5/2015 | Gupta et al. |
| 9,151,217 B2 | 10/2015 | Hilditch et al. |
| 2010/0037855 A1* | 2/2010 | French .................... F01D 25/16 |
| | | 123/323 |

FOREIGN PATENT DOCUMENTS

| | | | |
|---|---|---|---|
| JP | 2003-166416 A | | 6/2003 |
| JP | 2014-214732 A | | 11/2014 |
| JP | 2016-125407 A | | 7/2016 |
| JP | 2016125407 A | * | 7/2016 |
| WO | 2016/048678 A1 | | 3/2016 |

* cited by examiner

TURBOCHARGER ASSEMBLY WITH OIL CARRY-OVER PROTECTION

CLAIM FOR PRIORITY

This application claims benefit of priority of UK Patent Application No. 1700601.6, filed Jan. 13, 2017, which is incorporated herein by reference.

TECHNICAL FIELD

This invention relates to oil carry-over in turbochargers.

BACKGROUND

In this specification, a turbocharger is an assembly comprising a turbine driven in rotation by an exhaust gas flow, the turbine driving a compressor which urges an intake gas to flow through a compressor flowpath. Commonly the compressor and turbine are fixed on a shaft which rotates in bearings lubricated by a supply of oil, with the compressor supplying air to an internal combustion engine while the turbine is driven by the exhaust gas flow from the engine. The tendency for lubricating oil to leak from the shaft bearings into the intake gas flowing through the compressor flowpath is known as oil carry-over.

Since the exhaust gas flow rate varies with engine speed and load, it is common to provide means whereby an engine control unit may actively control the flow of exhaust gas through the turbine flowpath so as to optimise efficiency under different operating conditions.

One way to achieve this is to vary the geometry of the turbine flowpath, commonly by means of adjustable guide vanes arranged upstream of the turbine. For example, WO2016048678A1 discloses a turbocharger in which the guide vanes are controlled via a geared actuating mechanism by an actuator disposed outside the turbocharger bearing housing to alter the inflow angle of the exhaust gas at the turbine wheel inlet. The angle of attack of the guide vanes is controlled to maximise efficiency as the flow rate through the turbocharger varies.

The exhaust gas flow may also be controlled by means of a valve arranged to divert a variable proportion of the gas in the turbine flowpath to bypass the turbine. The diverted portion of the exhaust gas may be exhausted to ambient, in which case the valve is commonly termed a wastegate.

Similar flow control arrangements may be employed in a staged turbocharger assembly, in which two or more turbochargers are arranged in series flow relation to provide a higher compression ratio. For example, U.S. Pat. No. 9,003,794 (B2) discloses staged high and low pressure turbochargers having a valve for selectively bypassing the high and low pressure turbines.

SUMMARY

Disclosed herein is an assembly including a first turbocharger, the first turbocharger including a first turbine and a first compressor supported for rotation in bearings supplied with oil via an oil flowpath. A seal is arranged between the oil flowpath and the compressor flowpath to resist leakage of the oil into the compressor flowpath. A flow control means is also provided for controlling the rotational speed of the first turbine and first compressor by controlling the flow of exhaust gas in the turbine flowpath. The flow control means is arranged to operate to control the flow of exhaust gas in the turbine flowpath to maintain at least a minimum rotational speed of the first compressor, wherein the minimum rotational speed is selected to maintain at least a minimum pressure gradient across the seal from the compressor flowpath to the oil flowpath.

Also disclosed is a method of controlling oil leakage in a turbocharger assembly, including the steps of operating the flow control means to control the flow of exhaust gas in the turbine flowpath to maintain at least a minimum rotational speed of the first compressor, and selecting the minimum rotational speed to maintain at least a minimum pressure gradient across the seal from the compressor flowpath to the oil flowpath.

BRIEF DESCRIPTION OF THE DRAWINGS

Further features and advantages will be apparent from the illustrative embodiment which will now be described, purely by way of example and without limitation to the scope of the claims, and with reference to the accompanying drawings, in which:

Figure 1:
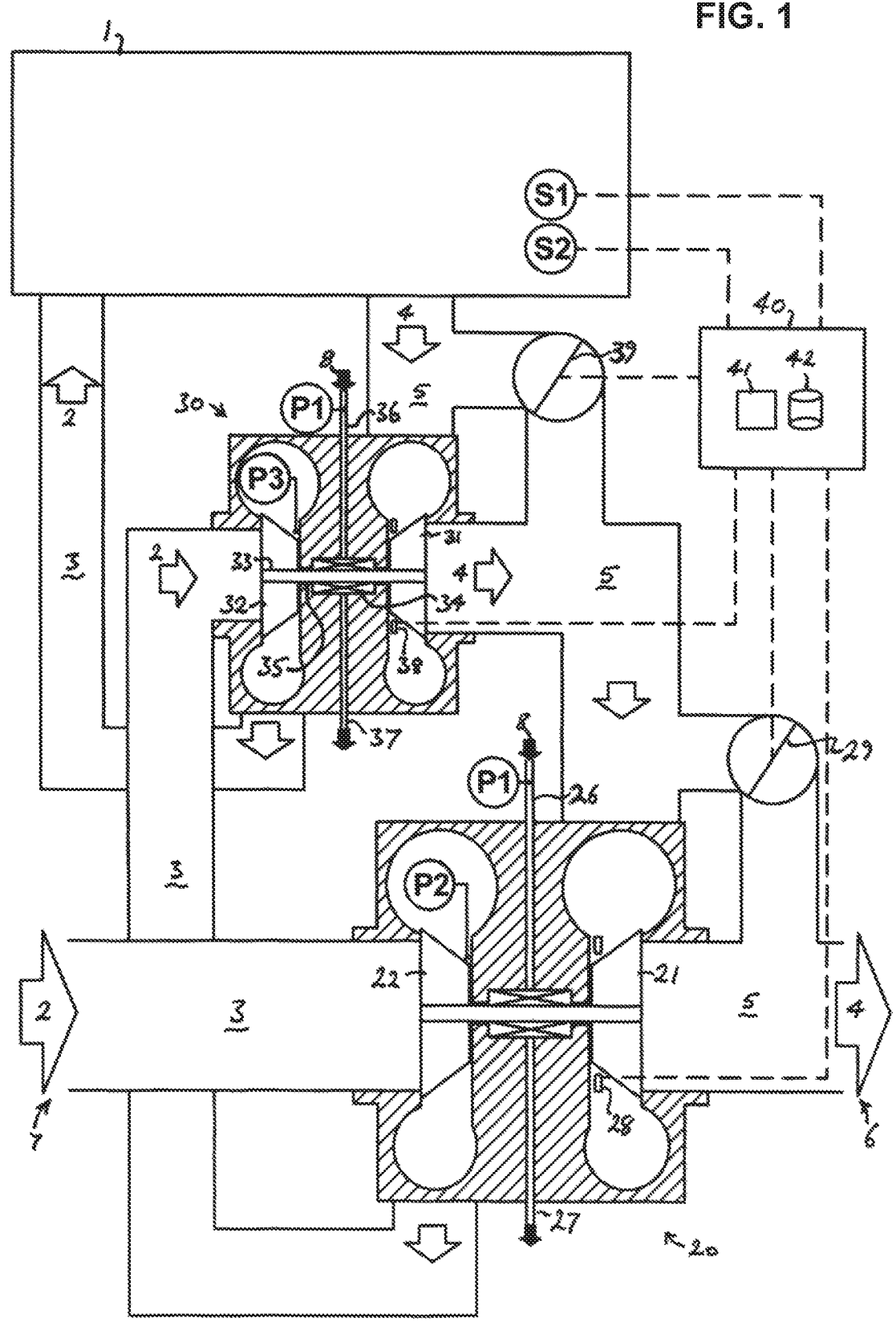
FIG. 1 shows schematically a staged turbocharger assembly including first (low pressure) and second (high pressure) turbochargers.

Reference numerals appearing in more than one of the figures indicate the same or corresponding features in each of them.

DETAILED DESCRIPTION

Figure 2:
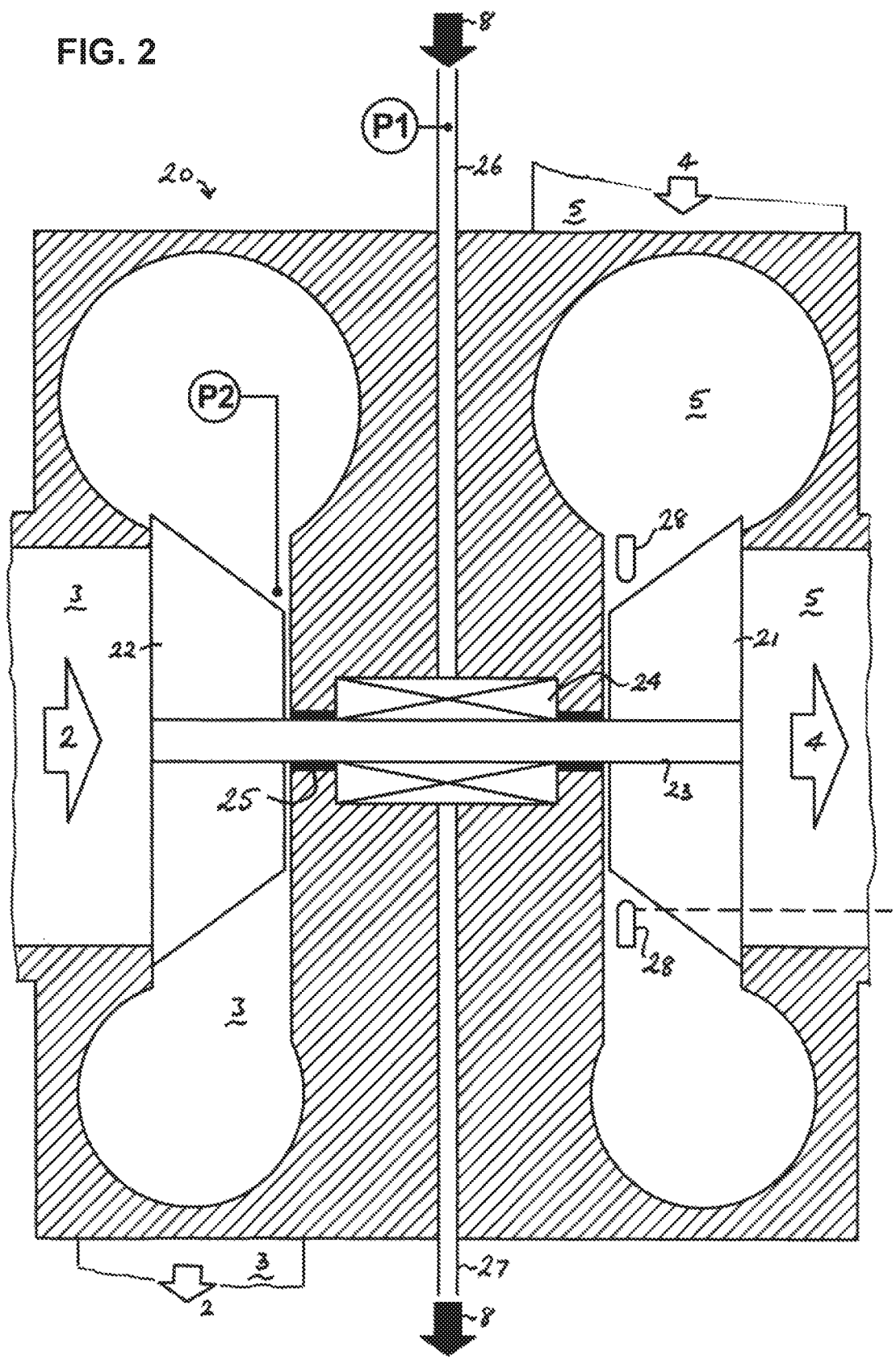
FIG. 2 is an enlarged view of the first (low pressure) turbocharger of FIG. 1.

Referring to FIGS. 1 and 2, an internal combustion engine 1 is arranged to receive an intake gas 2, in this case compressed air, from a staged turbocharger assembly via a compressor flowpath 3, and to supply an exhaust gas 4 at a variable flow rate back to the turbochargers via a turbine flowpath 5.

The turbocharger assembly comprises a first, low pressure turbocharger 20 and a second, high pressure turbocharger 30. The first turbocharger includes a first turbine 21 and a first compressor 22 mounted on a shaft 23 which is supported for rotation in bearings 24. The second turbocharger 30 is slightly smaller but otherwise the same as the first turbocharger, having a second turbine 31 and a second compressor 32 mounted on a shaft 33 which is supported for rotation in bearings 34. The respective turbine and compressor of each turbocharger 20, 30 are fixed to the respective shaft so that they rotate together at the same rotational speed with the turbine driving the compressor in rotation.

The two turbines (which is to say, the two turbine wheels) 21, 31 are arranged in series flow relation in the turbine flowpath 5, with the second turbine 31 upstream of the first turbine 21, so that as the exhaust gas leaves the engine it expands progressively through the second and then the first turbine, driving the turbines in rotation before exhausting to ambient via a final outlet 6.

The two compressors (which is to say, the two compressor wheels) 22, 32 are arranged in series flow relation in the compressor flowpath 3 so that the first compressor 22 draws air through the air inlet 7 and compresses it. The first compressor urges the compressed air to flow via the compressor flowpath to the second compressor 32, which further compresses the air before delivering it to the engine.

The shaft bearings 24, 34 are supplied with oil 8 via an oil flowpath 26, 36 at an oil pressure P1. Conveniently the oil may be delivered by a pump so as to flow through the bearings before flowing out via an outlet 27, 37 from which it drains back under gravity into a tank (not shown).

A seal 25, 35 is arranged between the oil flowpath 26, 36 and the compressor flowpath 3 to resist leakage of the oil 8 into the air or other intake gas flowing through the compressor flowpath. The seal 25, 35 may be any known type of oil seal and may include dynamic sealing features suitable for high speed assemblies as known in the art. Typically the seal will be arranged close to the compressor wheel on the downstream side of the compressor wheel with respect to the compressor flowpath, as shown. A pressure gradient, which is to say, a pressure differential or difference in pressure, thus exists across the seal from the intake gas side of the seal in the compressor flowpath to the oil side of the seal in the oil flowpath, which varies according to the pressure P1 of the oil in the bearings and the pressure P2, P3 of the intake gas at the respective seal 25 or 35 immediately downstream of the first or second compressor 22, 32. The effective pressure P2, P3 applied to the seal 25, 35 varies as a function of the rotational speed Rc of the respective compressor and will generally be the static pressure of the intake gas at that point, but may be a dynamic pressure if dynamic pressure effects are present, for example, due to the local geometry of the compressor flowpath.

The assembly further includes a flow control means which is operable to control a rotational speed of the first or second turbine 21, 31 and hence the first or second compressor 22, 32 by controlling the flow of exhaust gas 4 in the turbine flowpath 5.

The flow control means may be any arrangement as known in the art for controlling the flow of exhaust gas in the turbine flowpath. For example, it may comprise any adjustable element on which the exhaust gas flowing through the turbine flowpath may impinge, together with an adjustment means including for example an actuator (e.g. any suitable mechanical, pneumatic, hydraulic or electrical actuator) for adjusting the or each element so as to control the flow.

In the example shown, the flow control means includes four flow adjustment arrangements which are provided purely by way of illustration. It will be understood that in practice, any of these arrangements, or any other suitable arrangement may be employed for controlling the flow of exhaust gas.

Two of the illustrated adjustment arrangements comprise an array of guide vanes 28, 38, arranged respectively upstream of the first and second turbine 21, 31 and controlled by an actuator (not shown) which progressively rotates each vane about a pivot as known in the art. The guide vanes (only two of which are visible in the schematic drawing of each of the two turbochargers) are arranged in the turbine flowpath to surround the inlet region of each turbine so as to alter the angle at which the exhaust gas flowing between the vanes and along the surface of each of the vanes impinges upon the blades of the respective turbine.

The other two illustrated adjustment arrangements comprise two valves 29, 39 which are fluidly connected to the turbine flowpath, respectively upstream of the first turbine 21 and upstream of the second turbine 31. Each valve is progressively opened and closed by an actuator (not shown) as known in the art, so as to divert a portion or variable proportion of the exhaust gas in the turbine flowpath to bypass the respective turbine. The second valve 39 discharges the diverted portion of the exhaust gas back into the turbine flowpath downstream of the second turbine and upstream of the first turbine, while the first valve 29 discharges the diverted portion of the exhaust gas into the turbine flowpath downstream of the first turbine and upstream of the final outlet 6.

The flow control means includes an electronic controller 40, which may include a processor 41 and memory 42 and may interface or be integrated with an engine control unit of the engine 1. The controller 40 controls the or each adjustment arrangement including the vanes 28, 38 and valves 29, 39 via suitable mechanical, pneumatic, hydraulic, electrical or other actuators (not shown) as known in the art so as to control the flow of gas in the turbine flowpath by controlling the rotation of each turbine. Of course, mechanical control arrangements could be used instead of the controller 40. It will be understood that the speed of rotation of the first (low pressure) turbine and compressor 21, 22 may be controlled directly by adjusting vanes 28 and/or valve 29, or indirectly by controlling the rotation of the second turbine 31, for example, by adjusting vanes 38 and/or valve 39.

For example, the controller 40 may open the vanes 38 or valve 39 to allow a portion of the exhaust gas to bypass or flow more freely through the second (high pressure) turbine 31. This reduces its speed so that a greater proportion of the energy of the exhaust gas is transferred to the first turbine 21, increasing its rotational speed and so increasing the local pressure P2 on the downstream side of the first compressor 22. This in turn changes the pressure gradient across the seal 25 to resist leakage of oil through the seal, as will now be discussed.

Since each turbocharger 20, 30 is driven by the flow of exhaust gas, its rotational speed will be relatively low at low engine speed and engine load. Under these conditions it has been observed that the static pressure in the compressor flowpath 3 at or immediately downstream of the respective compressor 22, 32 can sometimes be lower than the oil pressure P1 in the oil flowpath, so that a negative pressure gradient exists across the oil seal 25, 35; which is to say, the static pressure on the oil side of the oil seal is higher than the static pressure on the intake air side.

It has been observed that this negative pressure gradient can cause oil to flow via the oil seal 25, 35 into the compressor flowpath 3.

Figure 6:
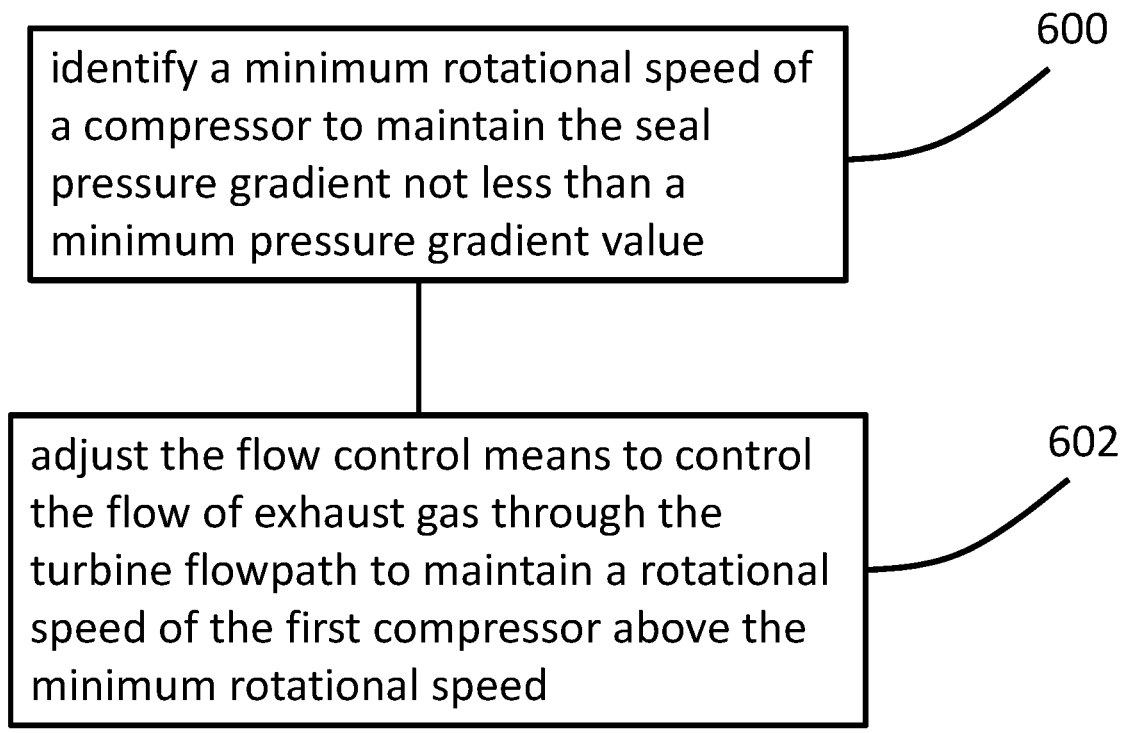
FIG. 6 is a flowchart of a method for operating flow control means, according to an aspect of the disclosure.

The flow control means 28, 38, 29, 39, 40 is arranged and operated to control the flow of exhaust gas in the turbine flowpath 5 to maintain at least a minimum rotational speed of the respective, first or second compressor 22, 32 (see e.g., FIG. 6, block 602), wherein the minimum rotational speed is selected to maintain at least a minimum pressure gradient across the seal 25, 35 of the respective turbocharger from the compressor flowpath to the oil flowpath (see e.g., FIG. 6, block 600).

The minimum pressure gradient may be selected to substantially prevent oil from leaking through the seal 25, 35 of the respective turbocharger from the oil flowpath 26, 36 into the compressor flowpath 3. The sensed pressure or other parameter values representing or corresponding to the minimum pressure gradient may be determined by testing and stored, e.g. as fixed values or a look-up table, in the memory 42 of the controller 40.

The minimum rotational speed may similarly be stored as a fixed value in the memory 42 of the controller 40. Alternatively the minimum rotational speed may be stored as a variable dependent on the measured value of one or more operational parameters such as the engine or oil temperature or the angle of inclination A of the assembly, as further discussed below, so that the controller 40 varies the minimum rotational speed as the measured parameter value changes, e.g. by means of a stored algorithm or look-up table. The pressures P1, P2, and/or P3 may also be measured by sensors and used as operational parameters by the controller 40.

The minimum pressure gradient may be selected to limit the negative pressure gradient across the seal from the compressor flowpath to the oil flowpath; which is to say, the static pressure of the intake gas in the compressor flowpath on the intake gas side of the seal is less than the static pressure of the oil in the oil flowpath on the oil side of the seal, but the pressure differential is limited to a value at which the seal is effective to prevent leakage of oil into the compressor flowpath.

Alternatively, the minimum pressure gradient may be a neutral pressure gradient across the seal from the compressor flowpath to the oil flowpath; which is to say, the static pressure of the intake gas in the compressor flowpath on the intake gas side of the seal is equal to the static pressure of the oil in the oil flowpath on the oil side of the seal. This arrangement may be adopted where the seal is effective to prevent leakage of oil into the compressor flowpath at a neutral pressure gradient.

Alternatively, the minimum pressure gradient may be a positive pressure gradient across the seal from the compressor flowpath to the oil flowpath; which is to say, the static pressure of the intake gas in the compressor flowpath on the intake gas side of the seal is greater than the static pressure of the oil in the oil flowpath on the oil side of the seal. This arrangement may be adopted to substantially prevent leakage of oil into the compressor flowpath, even where the seal is not fully effective at a neutral pressure gradient.

Where a staged turbocharger assembly is employed, the pressure in the compressor flowpath 3 is lower immediately downstream of the low pressure compressor 22 than it is immediately downstream of the high pressure compressor 32, and so oil carry-over is more likely to occur at the oil seal 25 immediately downstream of the low pressure compressor 22. Accordingly, the flow control means may be operated to maintain a minimum speed Rc of the first compressor 22 and hence the minimum pressure gradient across the seal 25, but not to maintain a minimum speed Rc of the second compressor 32.

It has also been observed that oil carry-over will tend to occur particularly when the assembly is angularly inclined away from a normal rest position, for example, when the turbocharger assembly including the engine 1 is mounted on a vehicle moving along a steep slope.

Figure 3:
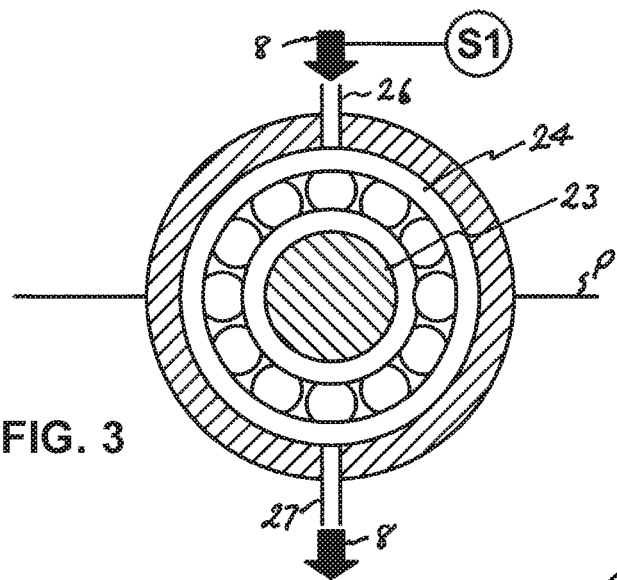
FIGS. 3 and 4 show the shaft and bearing of the first (low pressure) turbocharger in simplified transverse section, with the assembly respectively in a normal use position (FIG. 3) and an angularly inclined position (FIG. 4)
Figure 4:
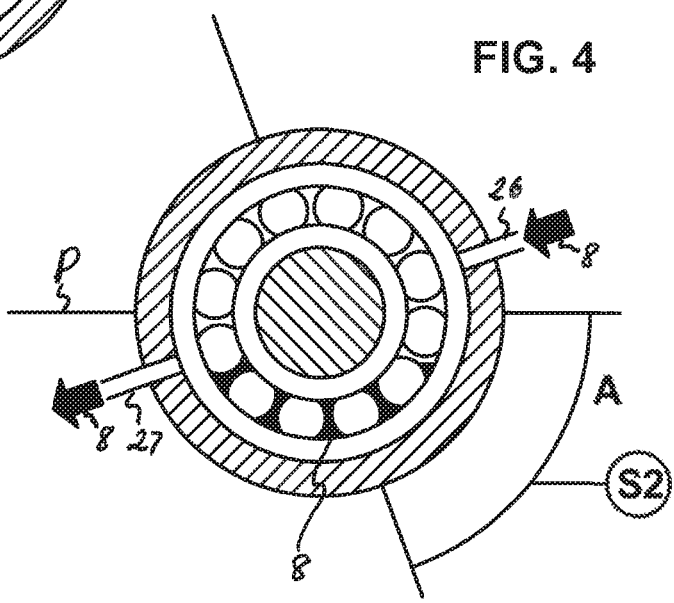

Referring to FIGS. 3 and 4, the shaft 23 of the first, low pressure turbocharger 20 is shown in simplified transverse section, respectively in a normal use or rest position (FIG. 3) and an inclined position (FIG. 4). In the inclined position the assembly is inclined away from a nominal horizontal reference plane by an angle of inclination A.

For ease of illustration, the angle of inclination A is defined in the (nominally vertical) plane of the section, which is normal to the (nominally horizontal) turbocharger shaft axis, and relative to a nominal horizontal reference plane P containing the turbocharger shaft axis. However, it will be understood that the assembly may be tilted in any direction, and so in practice the angle of inclination A may be defined in any vertical plane relative to the nominal horizontal reference plane P. Depending on expected service conditions, the assembly may be arranged to function normally at an angle of inclination A up to about 45 degrees or even more.

Whereas in the normal rest position (FIG. 3) the oil 8 is free to drain away from the bearings 24, it can be seen that in the inclined position of FIG. 4, the outlet 27 is raised so that a body of oil 8 is retained in the bearings in contact with the seal 25. This is observed to increase the incidence of oil carry-over into the compressor flowpath. The tendency of oil to pool in the bearings 24, 34 of each turbocharger, and hence the angle of inclination A at which oil carry-over is observed to occur, will vary depending inter alia on the design of the bearings and the oil flowpath 26, 36 and the operating environment of the assembly.

It will be understood that the flow control means allows the rotational speed Rc of the or each turbocharger to be controlled independently of engine speed and load. In a conventional turbocharger control regime, when the engine 1 is operating at low load and low speed, the flow control means of each turbocharger may be arranged to remain in a default or rest condition which allows the turbine to rotate at a relatively low speed. For example, vanes 28, 38 may be opened to allow free flow through the turbine, and/or valves 29, 39 may be opened to allow exhaust gas to bypass the turbine. In this condition the compressor does little or no work while the flow resistance of the turbine flowpath is minimised, which allows the engine to operate efficiently while consuming little or no fuel.

By way of example, a low load condition may be taken to exist when there is low fuel input (e.g. less than 50%, particularly less than 20% of maximum fuel flow rate) to the engine. A low speed condition may be taken to exist when the engine is rotating at less than 50%, particularly at less than 20% of its maximum rated or governed speed.

When the flow control means is operated to maintain at least the said minimum rotational speed of the respective compressor 22, 32 and so maintain said minimum pressure gradient across the seal 25 or 35, it will be understood therefore that the efficiency of the engine may be somewhat reduced from the optimum, default or rest condition of the flow control means; which is to say, flow resistance through the turbine flowpath may be somewhat increased compared with the default or rest condition wherein the respective compressor 22, 32 is allowed to rotate at a lower speed. For example, when the controller 40 operates to control the compressor in the minimum speed control regime, i.e. to maintain its speed at or above the minimum speed Rmin, it may close the vanes 28 or 38 or valve 29 or 39 to increase the speed of the respective turbine and compressor.

In order to maintain efficient operation when the risk of oil carry-over is low, for example, because the assembly is in a normal operating position which allows the oil to drain away freely from the bearings, it may therefore be desirable to maintain the flow control means in the conventional default or rest condition to minimise flow resistance and so optimise efficiency.

Accordingly, the assembly may further include one or more control signal generators for sending a control signal to the controller 40. The control signal generators may comprise for example switches or sensors for sensing, inter alia, the oil pressure P1, intake gas pressure P2, P3, engine speed and load, ambient temperature and intake air pressure, the speed of rotation of the or each turbine or compressor, and/or any other relevant operating parameter. In the illustrated example, there are two control signal generators, comprising first and second sensors S1, S2. The first sensor S1 is arranged to sense the temperature of the assembly, which is represented by the temperature of the oil 8; the sensor S1 may indicate for example whether the engine 1 is cold or at normal operating temperature. The second sensor S2 is an inclination sensor for sensing the angle of inclination A of the assembly relative to the normal use position.

The or each control signal generator may be arranged to send a control signal to the flow control means (e.g. to a processor within controller 40), which is operable responsive to the control signal, selectively to control the flow of exhaust gas in the turbine flowpath 5 to maintain the defined minimum rotational speed Rmin of the respective compressor 22, 32, and to control the flow of exhaust gas in the turbine flowpath 5 to allow the respective compressor 22, 32 to rotate at a speed below said minimum rotational speed. Thus the controller 40 may be arranged to cut-in and cut-out the minimum rotational speed control regime, responsive to the control signal.

The control signal generator may be used for example to initiate the minimum speed control regime when the risk of oil carry-over becomes significant. This could be for example, because the assembly is likely to be inclined away from the normal use position, or because a vehicle on which the assembly is mounted is about to move over rough or hilly terrain in which the normal gravity drainage of oil from the bearings may be momentarily interrupted by sudden vehicle movements.

Figure 7:
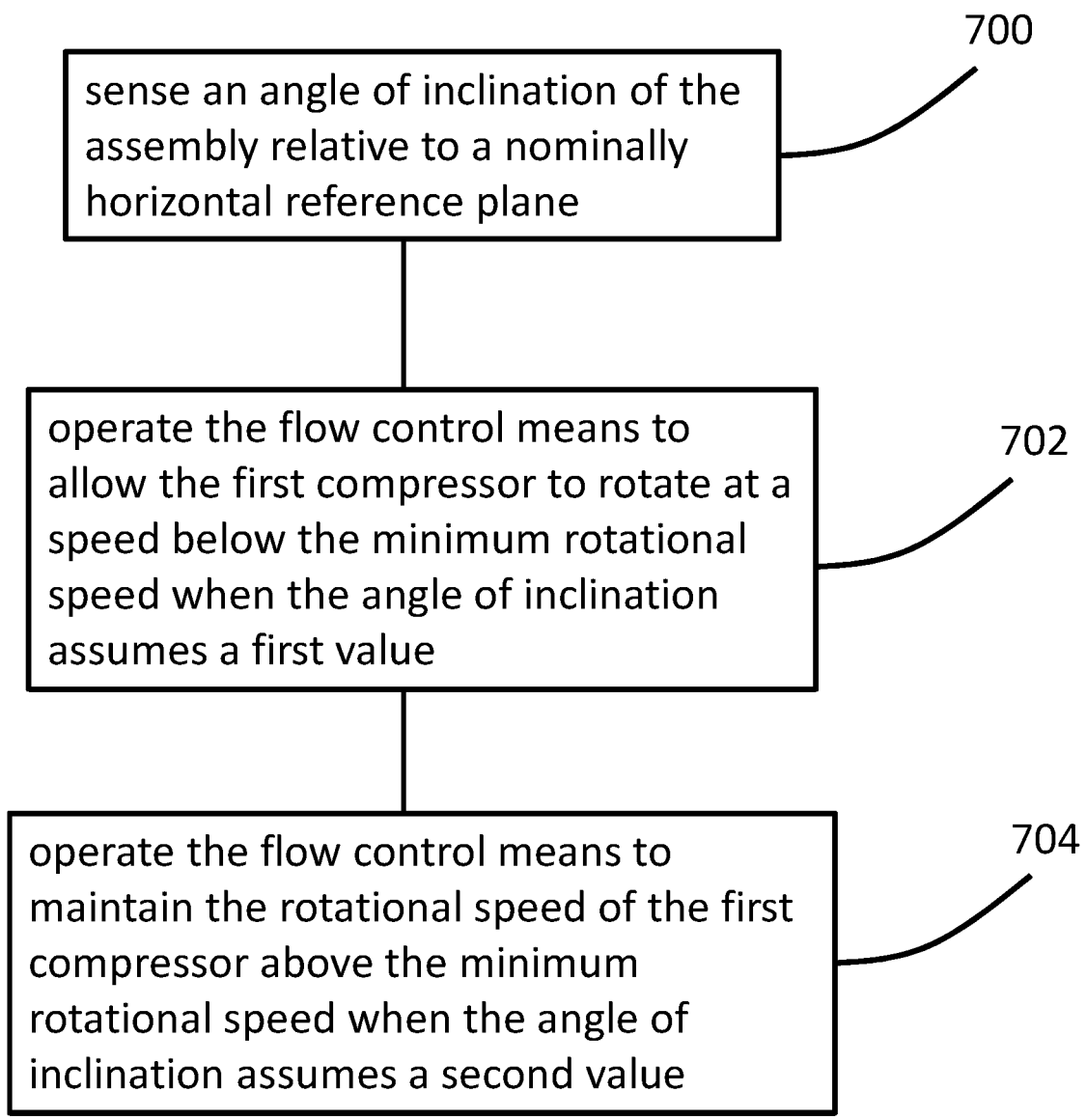
FIG. 7 is a flowchart of a method for operating flow control means, according to another aspect of the disclosure.

For example, as shown in block 700 of the non-limiting aspect illustrated in FIG. 7, an angle of inclination of the assembly relative to a nominally horizontal reference plane may be sensed. In block 702, the flow control means may be operated to allow the first compressor to rotate at a speed below the minimum rotational speed when the angle of inclination assumes a first value. In block 704, the flow control means may be operated to maintain the rotational speed of the first compressor above the minimum rotational speed when the angle of inclination assumes a second value.

The control signal generator could be a manual or automatic switch or other control which is selectively adjustable, for example, between a normal operating position and an off-road or steep terrain operating position, providing a binary (cut-in/cut-out) signal to initiate and/or terminate the minimum speed flow control regime.

Alternatively or additionally, the or each control signal generator may be arranged to send a progressively variable control signal to the flow control means (e.g. to the controller 40). For example, the control signal could be variable, either continuously or incrementally (step-wise). In this case the flow control means (e.g. the controller 40, acting on the vanes 28, 38 and valves 29, 39) may be arranged to provide progressively (e.g. continuously or incrementally) variable control of the flow of gas in the turbine flowpath to progressively vary the rotational speed of the first compressor responsive to the control signal.

Irrespective of whether a control signal is provided, and both in the case where the control signal is a binary (cut-in/cut-out) signal and in the case where the control signal is a progressively variable signal, the actual momentary rotational speed Rc of the respective compressor and/or the actual momentary pressure gradient across the seal 25, 35 may be calculated by the processor 41 based on a function (e.g. an algorithm or look-up table) stored in the memory 42 of the actual momentary sensed value of another operational parameter or parameters, or may be directly sensed as an input to the processor 41. The sensed or calculated value may then be compared with a stored value, or with a value calculated by the processor 41 based on a function (e.g. an algorithm or look-up table) stored in the memory 42 of the actual momentary sensed value of another operational parameter or parameters, representing the minimum rotational speed Rmin or minimum pressure gradient.

Both in the case where the control signal is a binary (cut-in/cut-out) signal and in the case where the control signal is a progressively variable signal, the control signal generator may include one or more sensors, in which case it is arranged to generate the control signal responsive to at least one sensed value.

In the illustrated example, the control signal generator comprises the oil temperature sensor S1 and the angular inclination sensor S2, each of which sends a control signal, indicative respectively of the oil temperature and the angular inclination A of the assembly, to the controller 40.

The controller 40 may compare the parameter value represented by the control signal from each sensor with a stored parameter threshold value to determine if the parameter value lies inside or outside a normal operating range, which for sensor S1 may indicate that the engine is being started from cold while for sensor S2 may indicate that a vehicle on which the engine is mounted is being operated on steep terrain.

The controller may then cut-in or cut-out the minimum speed regime responsive to determining whether the sensed parameter value lies inside or outside the normal operating range.

Alternatively or additionally, the controller may vary the value Rmin representing the minimum rotational speed of the compressor, depending on the value of the control signal. For example, the controller may be arranged to maintain the value Rmin at zero or at a very low value until the signal from S1 or S2 reaches a stored threshold value, and then to increase the value Rmin progressively as the sensed parameter value of the signal increases.

For example, if it is desired to cut-in and cut-out the minimum speed regime for the first or second compressor 22, 32 responsive to a change in the angle of inclination A of the assembly, then the flow control means may be arranged to allow the first or second compressor 22, 32 to rotate at a rotational speed Rc below the minimum rotational speed Rmin when the assembly is in the normal use position, and to operate to maintain the minimum rotational speed Rmin responsive to an increase in the angle of inclination A.

For example, the controller may be arranged to operate to maintain the minimum rotational speed Rmin responsive to an increase in the angle of inclination A to a value greater than about 30°, particularly greater than about 40°, most particularly greater than about 50° relative to the normal rest position.

Figure 5:
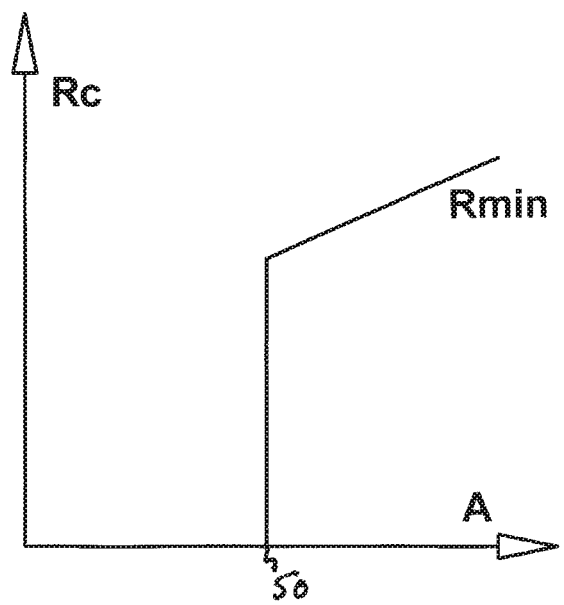
FIG. 5 is a simplified graph showing how the minimum rotational speed Rmin of the first compressor may be varied with the angle of inclination A of the assembly.

FIG. 5 illustrates a simple control regime of this type, wherein the point 50 represents the angle of inclination A at which the controller will operate to cut-in the minimum speed regime for the second compressor 22; which is to say, to maintain the speed Rc of the compressor at or above the minimum speed Rmin. At angles of inclination below the point 50, the controller does not operate to cut-in the minimum speed regime (i.e. it cuts-out the minimum speed regime), so that below that point the minimum rotational speed Rmin has a null or zero value and the first compressor 22 will rotate at a speed determined by the default or rest condition of the flow control means and the momentary speed and load conditions of the engine 1.

The minimum rotational speed Rmin at the cut-in point 50 is selected to maintain at least the minimum pressure gradient across the seal 25 from the compressor flowpath 3 to the oil flowpath 26, preferably sufficient to substantially prevent oil carry-over via the seal 25.

In the illustrated example, the minimum rotational speed is arranged to increase as the angle of inclination A increases above the cut-in point 50. The optimal rate of increase required to obviate oil carry-over may be derived e.g. from a look-up table based on the behaviour of the assembly as determined during pre-production testing. Of course, the function could be non-linear rather than linear as shown.

In summary, a turbocharger assembly may be provided with an exhaust gas flow control means operable to control the flow of exhaust gas in the turbine flowpath. The flow control means is operated, optionally responsive to sensor input, to maintain at least a minimum rotational speed of the compressor. The minimum rotational speed is selected to maintain at least a minimum pressure gradient across the seal from the compressor flowpath to the oil flowpath to suppress oil carry-over from the shaft bearings, for example, when the assembly is operating in an inclined position.

INDUSTRIAL APPLICABILITY

The novel method and flow control means may be employed to reduce or eliminate oil carry-over in an otherwise conventional, single-stage or multi-stage turbocharger assembly.

Although the novel method has been described with reference to a staged turbocharger assembly on an internal combustion engine, it will be appreciated that it may be used to also in other, single stage or multi-stage turbocharger assemblies with flow control arrangements which may be similar or different to the examples shown. Many further possible adaptations within the scope of the claims will be evident to those skilled in the art.

In the claims, reference numerals and letters are provided in parentheses for ease of reference and should not be construed as limiting features.

What is claimed is:

1. An assembly comprising:
    a first turbocharger including a first turbine and a first compressor,
        the first turbine being arranged in a turbine flowpath to be driven in rotation by an exhaust gas flowing at a variable flow rate through the turbine flowpath,
        the first compressor being arranged in a compressor flowpath to be driven in rotation by the first turbine via a first shaft to urge an intake gas to flow through the compressor flowpath;
    bearings supporting the first shaft for rotation of the first turbine and the first compressor, the bearings being supplied with oil via an oil flowpath at an oil pressure;
    a seal arranged between the oil flowpath and the compressor flowpath to resist leakage of the oil into the compressor flowpath, a seal pressure gradient being defined by a pressure of the compressor flowpath acting on the seal minus the oil pressure;
    flow control means operable to control a rotational speed of the first turbine and first compressor by controlling the flow of exhaust gas through the turbine flowpath; and
    a controller operatively coupled to the flow control means, the controller being configured to
        identify a minimum rotational speed of the first compressor to maintain the seal pressure gradient not less than a minimum pressure gradient value, and
        adjust the flow control means to control the flow of exhaust gas through the turbine flowpath to maintain a rotational speed of the first compressor above the minimum rotational speed.

2. The assembly according to claim 1, wherein the minimum pressure gradient value corresponds to a neutral or positive seal pressure gradient.

3. The assembly according to claim 1, wherein the flow control means includes guide vanes arranged upstream of the first turbine to direct the flow of exhaust gas into the first turbine.

4. The assembly according to claim 1, wherein the flow control means includes a bypass valve arranged upstream of the first turbine to bypass a portion of the exhaust gas in the turbine flowpath around the first turbine.

5. The assembly according to claim 1, further comprising a second turbocharger having a second compressor arranged in the compressor flowpath in series flow relation with the first compressor, and a second turbine arranged in the turbine flowpath in series flow relation with the first turbine, the second compressor being driven in rotation by the second turbine,
    wherein the flow control means is arranged to control the flow of exhaust gas through the turbine flowpath by controlling a rotational speed of the second turbine.

6. The assembly according to claim 5, wherein the flow control means includes guide vanes arranged upstream of the second turbine to direct the flow of exhaust gas into the second turbine.

7. The assembly according to claim 5, wherein the flow control means includes a bypass valve arranged upstream of the second turbine to bypass a portion of the exhaust gas around the second turbine.

8. The assembly according to claim 1, wherein the controller is further configured to
    generate a first control signal based on the minimum rotational speed, and transmit the first control signal to the flow control means to maintain the rotational speed of the first compressor above the minimum rotational speed, and
    generate a second control signal, and transmit the second control signal to the flow control means to allow the speed of the first compressor to drop below the minimum rotational speed, and
    wherein the flow control means is operable to vary the flow of exhaust gas through the turbine flowpath in response to the first control signal and the second control signal.

9. The assembly according to claim 1, wherein the controller is further configured to generate a progressively variable control signal, and transmit the progressively variable control signal to the flow control means, and
    wherein the flow control means is configured to effect progressively variable control of the flow of gas in the turbine flowpath to progressively vary the rotational speed of the first compressor responsive to the progressively variable control signal.

10. The assembly according to claim 8, further comprising at least one sensor operatively coupled to the controller and configured to generate a signal indicative of at least one sensed value,
    wherein the controller is further configured to generate the first control signal responsive to the signal indicative of the at least one sensed value.

11. The assembly according to claim 10, wherein the at least one sensor includes an inclination sensor for sensing an angle of inclination of the assembly relative to a nominally horizontal reference plane.

12. The assembly according to claim 10, wherein the at least one sensor includes a temperature sensor for sensing a temperature of the assembly.

13. The assembly according to claim 1, further comprising an internal combustion engine arranged to receive the intake gas from the compressor flowpath and to supply the exhaust gas to the turbine flowpath.

14. The assembly according to claim 9, further comprising at least one sensor operatively coupled to the controller and configured to generate a signal indicative of at least one sensed value,
wherein the controller is further configured to generate the progressively variable control signal responsive to the at least one sensed value.

15. The assembly according to claim 14, wherein the at least one sensor includes an inclination sensor for sensing an angle of inclination of the assembly relative to a nominally horizontal reference plane.

16. The assembly according to claim 14, wherein the at least one sensor includes a temperature sensor for sensing a temperature of the assembly.

17. The assembly according to claim 1, wherein the minimum pressure gradient value corresponds to a negative seal pressure gradient.

18. The assembly according to claim 1, wherein the controller is further configured to identify the minimum rotational speed of the first compressor based on fixed values stored in a memory of the controller, a fluid pressure measurement within the compressor flowpath, a fluid pressure measurement within the oil flowpath, or combinations thereof.

19. A method for controlling oil leakage in an assembly, the assembly including:
a first turbocharger including a first turbine and a first compressor,
the first turbine being arranged in a turbine flowpath to be driven in rotation by an exhaust gas flowing at a variable flow rate through the turbine flowpath,
the first compressor being arranged in a compressor flowpath to be driven in rotation by the first turbine via a first shaft to urge an intake gas to flow through the compressor flowpath;
bearings supporting the first shaft for rotation of the first turbine and the first compressor, the bearings being supplied with oil via an oil flowpath at an oil pressure;
a seal arranged between the oil flowpath and the compressor flowpath to resist leakage of the oil into the compressor flowpath, a seal pressure gradient being defined by a pressure of the compressor flowpath acting on the seal minus the oil pressure;
flow control means operable to control a rotational speed of the first turbine and first compressor by controlling the flow of exhaust gas through the turbine flowpath; and
a controller operatively coupled to the flow control means,
the method comprising:
identifying, via the controller, a minimum rotational speed of the first compressor to maintain the seal pressure gradient not less than a minimum pressure gradient value; and
adjusting, via the controller, the flow control means to control the flow of exhaust gas through the turbine flowpath to maintain a rotational speed of the first compressor above the minimum rotational speed.

20. The method according to claim 19, further comprising:
sensing an angle of inclination of the assembly relative to a nominally horizontal reference plane;
operating the flow control means to allow the first compressor to rotate at a speed below said minimum rotational speed when the angle of inclination assumes a first value; and
operating the flow control means to maintain the rotational speed of the first compressor above the minimum rotational speed when the angle of inclination assumes a second value that is not equal to the first value.

* * * * *